UNITED STATES PATENT OFFICE.

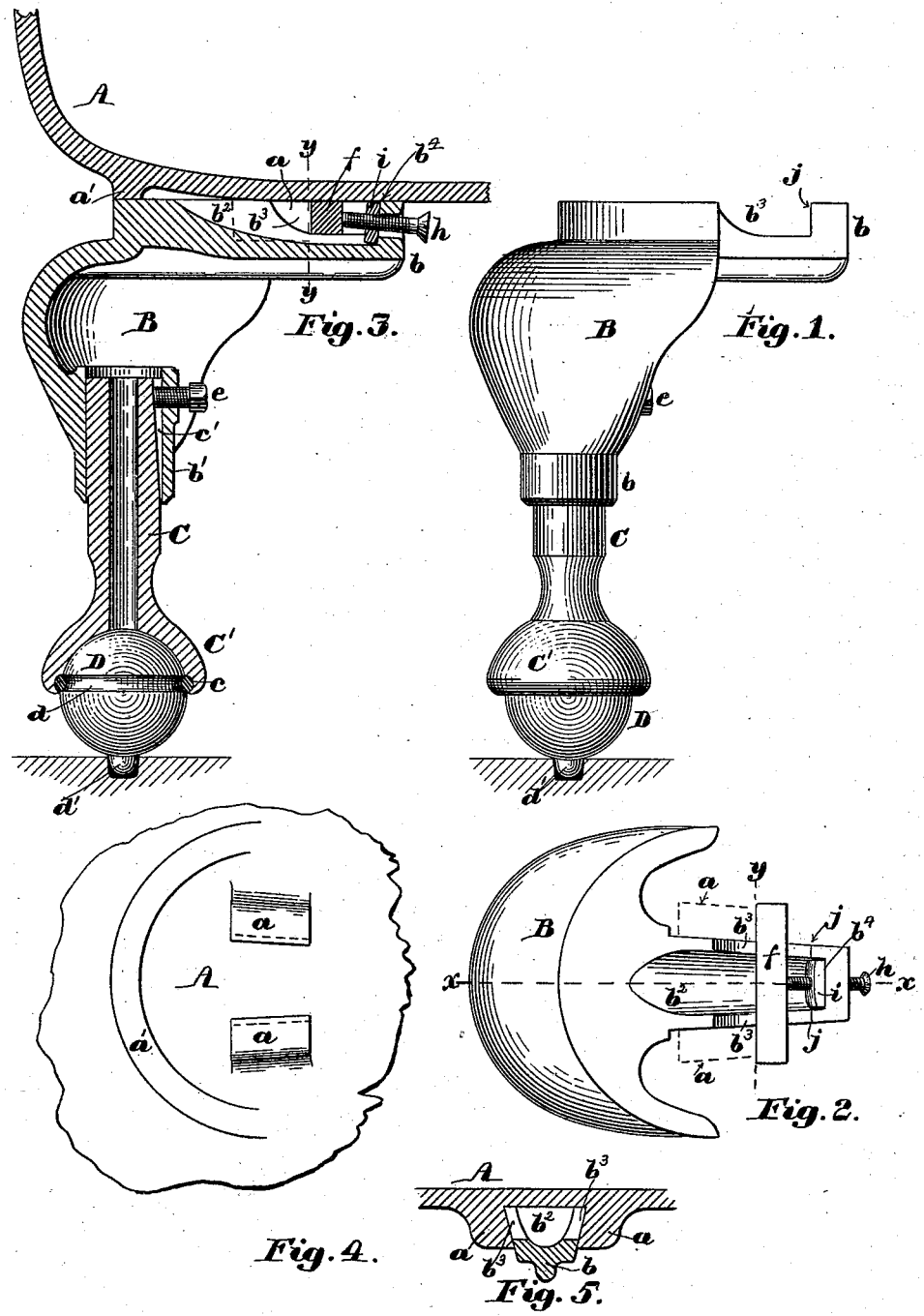

JOHN H. STEVENS, JR., OF CAMBRIDGE, MASSACHUSETTS.

LEG FOR BATH-TUBS OR OTHER ARTICLES.

SPECIFICATION forming part of Letters Patent No. 543,196, dated July 23, 1895.

Application filed October 29, 1894. Serial No. 527,283. (No model.)

*To all whom it may concern:*

Be it known that I, JOHN H. STEVENS, Jr., of Cambridge, in the county of Middlesex and State of Massachusetts, have invented certain new and useful Improvements in Legs for Bath-Tubs or other Articles, of which the following, taken in connection with the accompanying drawings, is a specification.

My invention relates to legs for bath-tubs and other articles; and it consists in certain novel features of construction, arrangement, and combination of parts, which will be readily understood by reference to the description of the accompanying drawings and to the claims hereto appended, and in which my invention is clearly pointed out.

Figure 1 of the drawings is a side elevation of my improved leg detached. Fig. 2 is a plan of the same, with the side lugs which form the socket to receive the shank of said leg shown in dotted lines. Fig. 3 is a vertical section on line $x\ x$ on Fig. 2 and through a small section of a bath-tub to which said leg is attached. Fig. 4 is an inverted plan of a small portion of the bath-tub, showing the seat for said leg and the dovetailed socket to receive its shank. Fig. 5 is a transverse section of the shank of said leg on line $y\ y$ on Fig. 3.

In the drawings, A is a small portion of a bath-tub, made of cast metal and having formed upon the under side of its bottom the lugs $a\ a$, the inner or opposing faces of which are dovetailed or undercut in a vertical direction and inclined in opposite directions longitudinally to a vertical plane intermediate between said faces, so as to form a tapered and dovetailed socket to receive the connecting arm or shank of the leg having a corresponding taper longitudinally and dovetailed in cross-section, in a well-known manner.

The tub A may have formed on its under side the crescent-shaped rib or chipping-piece $a'$, for the purpose of forming a level seat to bear upon the upper surface of the leg, as shown in Figs. 3 and 4; or said rib may form a part of the leg, which would then conform to the curve of the bottom of the tub, also in a well-known manner.

B is the main body of the leg, provided at its upper end with the horizontal tapered and dovetailed arm or shank $b$, fitted to engage the dovetailed socket on the bath-tub or other article and projecting inward beyond the inner ends of the socket-lugs $a$, and has formed in its lower end a vertical cylindrical socket $b'$ to receive the adjustable shank C, on the lower end of which is formed an inverted hemispherical cup $C'$, in the inner surface of which, near its rim, is formed an annular groove $c$; and D is a ball, of glass, porcelain, or other non-corrodible material, fitted to said cup and provided with the annular groove $d$, which, with the groove $c$, is filled with lead or other suitable packing material to secure said ball in position.

The ball D has formed thereon the downwardly-projecting lug or teat $d'$ to fit into a hole in the floor of the room to prevent the tub being accidentally moved out of position.

The shank C has formed in the side of that portion thereof which is within the socket $b'$ the groove $c'$, the bottom of which is made tapering or inclined to the axis of said shank, and is designed to receive the end of the set-screw $e$, fitted to a threaded hole in the body B of the leg and adapted to secure the shank C in the socket of said body in the desired adjusted position, so that the legs of the bath-tub or other article may be readily adjusted to any unevenness in the floor of the room where it is to be set up, the inclined bottom of the groove $c'$ acting as a wedge upon the set-screw $e$ when the weight of the tub or other article is resting upon the leg to more firmly grip the shank C.

The arm or shank $b$ of the body B of the leg has formed in its upper side a recess $b^2$, the side walls of which are cut away, as shown at $b^3$ in Figs. 1, 2, and 5, to receive the clamping-bar $f$ or the keys $g$. The bar $f$ rests against the inner ends of the socket-lugs $a\ a$, against which it is pressed by the set-screw $h$ to draw the shank $b$ into close engagement with said socket-lugs and prevent the leg "kicking" or becoming accidentally disengaged from said socket. The set-screw $h$ is shown as working in the nut $i$, fitted to the space between the side walls of the recess $b^2$ and bearing against the end wall $b^4$ of said recess, as shown in Figs. 2 and 3; but said screw may be threaded in said end wall, if desired, without affecting the principles of my invention.

The operation of my invention will be readily understood from the foregoing without further description here.

It is obvious that the socket may be formed in the top of the leg and a single tapering dovetailed lug be formed on the article to be supported and substantially the same result be obtained without affecting the principles of my invention.

As the metallic portions of the leg that are to be exposed to view are to be ornamented by painting and varnishing or japanning all that part of the shank C that is below the lower end of the socket $b'$, when the leg is adjusted to its greatest length, as shown in Figs. 1 and 3, is made of somewhat smaller diameter than that portion which fits within said socket $b'$, and is not painted or japanned, so that when the leg is adjusted to a shorter length that portion which is painted or japanned will not be scratched or marred by being moved upward into said socket.

What I claim as new, and desire to secure by Letters Patent of the United States, is—

1. In combination with a bath tub or other article to be supported having a tapering dovetailed socket upon its under side; a leg provided with a tapering dovetailed arm or shank to fit said socket, and projecting inward beyond said socket and having a notch formed in its upper surface; a bar resting in said notch and against the inner end of said socket; and a set-screw carried by said arm and operating against said bar to clamp it against said socket and secure said leg in position.

2. A metal leg for supporting bath tubs or other articles having a hemi-spherical inverted cup formed on its lower end with an annular groove or enlargement formed in its interior near its rim; in combination with a ball of glass, porcelain, or other non-corrodible material set in said cup having a circumferential groove formed thereon; and a gasket of lead or other suitable packing filling said groove and the groove in the cup as set forth.

3. The combination in a leg for supporting bath tubs or other articles, of a main body provided with a vertical cylindrical socket in its lower end; a lower section fitted to and adjustable vertically in said socket, and provided with a longitudinal groove having an inclined bottom in its upper portion; and a set-screw set in said main body and impinging upon the inclined bottom of said groove to clamp said lower section in position in said main body.

4. A metal leg for supporting bath tubs or other articles having a recess or cavity in its lower end; in combination with an annular groove or enlargement in the interior of said recess or cavity, near its rim; a foot of non-corrodible material fitted to said recess; a circumferential groove formed in the outer surface of said foot; and a packing of suitable material filling the grooves in said recess and said foot to secure said foot in position.

In testimony whereof I have signed my name to this specification, in the presence of two subscribing witnesses, on this 24th day of October, A. D. 1894.

JOHN H. STEVENS, JR.

Witnesses:
N. C. LOMBARD,
H. THEODORE FLETCHER.